United States Patent [19]

Davis

[11] Patent Number: 5,767,418
[45] Date of Patent: Jun. 16, 1998

[54] ELECTROMAGNETIC FLOWMETER WITH SINGLE BOBBIN COIL

[75] Inventor: James W. Davis, New Britain, Pa.

[73] Assignee: Elsag International N.V., Amsterdam, Netherlands

[21] Appl. No.: 781,353

[22] Filed: Jan. 21, 1997

[51] Int. Cl.$^6$ .................................................. G02F 58/00
[52] U.S. Cl. .................... 73/861.12; 73/861.08; 73/861.15
[58] Field of Search ................ 73/861.08, 861.12, 73/861.15

[56] References Cited

U.S. PATENT DOCUMENTS

| | | | |
|---|---|---|---|
| 3,754,824 | 8/1973 | Mannherz et al. | 73/194 |
| 3,842,669 | 10/1974 | Iversen | 73/861.12 X |
| 4,614,121 | 9/1986 | Hansen et al. | 73/861.12 |
| 4,716,769 | 1/1988 | Yamada | 73/861.12 |
| 4,736,634 | 4/1988 | Amata | 73/861.12 |
| 5,247,837 | 9/1993 | Corpron | 73/861.12 |
| 5,426,984 | 6/1995 | Rovner et al. | 73/861.12 X |
| 5,450,758 | 9/1995 | Smoll | 73/861.12 |
| 5,583,299 | 12/1996 | Murase | 73/861.12 |

*Primary Examiner*—Elizabeth L. Dougherty
*Attorney, Agent, or Firm*—Michael M. Rickin; Andrew Mey

[57] ABSTRACT

An electromagnetic flowmeter having a single bobbin coil for developing a magnetic field through which a liquid passes. The single bobbin coil is a part of an electromagnet unit which also includes first and second pole pieces which are disposed symmetrically about the channel through which the liquid passes. The pole pieces are focused toward the liquid flow channel to develop a uniform magnetic field which extends through the channel.

4 Claims, 1 Drawing Sheet

ELECTROMAGNETIC FLOWMETER WITH SINGLE BOBBIN COIL

BACKGROUND OF THE INVENTION

This invention relates generally to electromagnetic flowmeters, and more particularly to an electromagnetic flowmeter having a single bobbin coil.

The operation of an electromagnetic flowmeter is based on Faraday's law of electromagnetic induction, which is described in detail in U.S. Pat. No. 3,745,824. Applying Faraday's law, a flow rate may be measured by allowing the liquid of interest to be passed through a magnetic field, thereby producing a voltage which can be detected by diametrically opposed electrodes and converted into a flow rate signal. Since the induced voltage is proportional to the average velocity of the liquid, the electromagnetic flowmeter can be calibrated to indicate the volumetric flow rate of the liquid passing through it.

The prior art includes various means for producing the required magnetic field. Most electromagnetic flowmeters include double coil arrangements of electromagnets, comprised of yokes or cores on which wiring is wound, for developing the magnetic field. Although single coil arrangements have been used in the past, the prevalent view is that double coils, symmetrically disposed about the channel through which the liquid flows, provide the desired uniformity of the magnetic field which will produce the most accurate measurements of flow rate of the liquid passing through the flowmeter. Generally, producers of electromagnetic flowmeters have not been able to reduce the sizes of their products sufficiently because of the perception that their flowmeters should have double coil arrangements for developing the magnetic field.

One form of electromagnet which has been used in double coil electromagnetic flowmeters is the bobbin-type coil. This form of electromagnet is simple in construction and relatively easy to produce.

SUMMARY OF THE INVENTION

An electromagnetic flowmeter, constructed in accordance with the present invention, includes a non-conductive spool body having a central channel and first and second diametrically opposed cavities extending from the central channel. This flow meter also has first and second measuring electrodes, respectively positioned in the first and second cavities of the non-conductive spool body and an electromagnet unit for developing a magnetic field extending through the central channel of the non-conductive spool body. The electromagnet unit has a single bobbin coil having a longitudinal axis extending through the center of the central channel of the non-conductive spool, a first pole piece of highly permeable magnetic material extending from a first end of the single bobbin coil toward the central channel of the non-conductive spool, a second pole piece of highly permeable magnetic material extending toward the central channel of the non-conductive spool and diametrically opposed from the first pole piece, and a magnetic return path extending between the second pole piece and a second end of the single bobbin coil. The single bobbin coil is held in position to the non-conductive spool body only by the first pole piece.

DETAILED DESCRIPTION OF THE INVENTION

Figure 1:
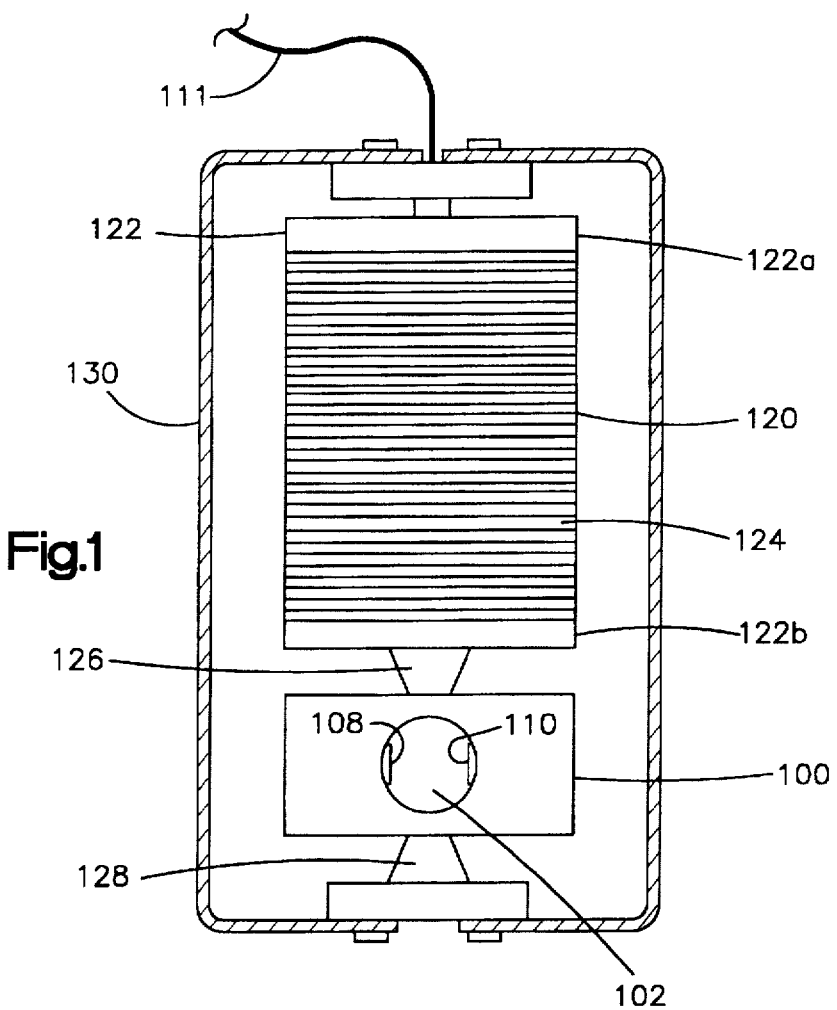
FIG. 1 is a front view of a flowmeter constructed in accordance with the present invention.
Figure 2:
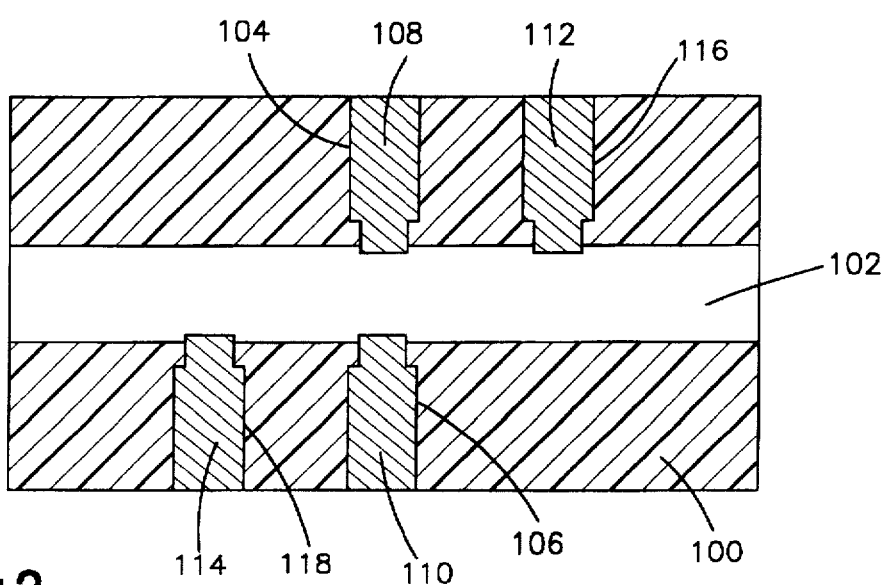
FIG. 2 is a sectional view of a flowmeter constructed in accordance with the present invention.

Referring to FIGS. 1 and 2, an electromagnetic flowmeter, constructed in accordance with the present invention, includes a non-conductive spool body 100 having central channel 102 through which liquid flows and first and second diametrically opposed cavities 104 and 106 extending from the central channel. First and second measuring electrodes 108 and 110 are, respectively, positioned in first and second cavities 104 and 106 of non-conductive spool body 100. A cable 111 includes leads connected to first and second measuring electrodes 108 and 110 and along which signals developed by the measuring electrodes are conducted to circuitry which processes these signals and provides an indication of the liquid flow through central channel 102 of non-conductive spool body 100.

Preferably, the electromagnetic flowmeter of FIGS. 1 and 2 also has grounding electrodes 112 and 114, respectively positioned in cavities 116 and 118. Relative to liquid flow through the electromagnetic flowmeter, cavity 116 and grounding electrode 112 are upstream of measuring electrodes 108 and 110 and cavity 118 and grounding electrode 114 are downstream of the measuring electrodes.

An electromagnetic flowmeter, constructed in accordance with the present invention, also has an electromagnet unit for developing a magnetic field extending through central channel 102 of non-conductive spool 100. As shown in FIG. 1, the electromagnet unit has a single bobbin coil 120, the longitudinal axis of which extends through the center of central channel 102 of non-conductive spool body 100. Single bobbin coil 120 includes a spool bobbin 122 and wiring 124 wound on the spool bobbin between end flanges 122a and 122b. Cable 111 includes leads connected to wiring 124 by which current is conducted to the wiring to develop the magnetic field.

The electromagnet unit also has a first pole piece 126 of highly permeable magnetic material extending from a first end of single bobbin coil 120 toward central channel 102 of non-conductive spool body 100 and a second pole piece 128 also of highly permeable magnetic material extending toward the central channel of the non-conductive spool, diametrically opposed from first pole piece 126, and on an axis common with first pole piece 126. The magnetic path is completed by a return magnetic conductor 130 extending between second pole piece 128 and a second end of first pole piece 126. Preferably, single bobbin coil 120 is held in position to non-conductive spool body 100 by first pole piece 126.

In operation, wiring 124 is energized by a bi-polar current source operating at a low frequency which is a sub multiple of the power line frequency. It will be noted from FIG. 1, that first pole piece 126 and second pole piece 128 preferably have conical shapes which are focused toward central channel 102 of non-conductive spool body 100. This shaping of the pole pieces and the nature of the pole pieces (i.e. highly permeable) contribute to the development of a uniform magnetic field developed by a single coil disposed to one side of the central channel 102.

Although the present invention has been described with reference to exemplary embodiments, it is not limited thereto. Rather, the appended claims should be construed to include other variants and embodiments of the invention which may be made by those of ordinary skill in the art without departing from the true spirit and scope of the present invention.

What is claimed:

1. An electromagnetic flowmeter comprising:

a non-conductive spool body having:
   (a) central channel; and
   (b) first and second diametrically opposed cavities extending from said central channel;

first and second measuring electrodes, respectively positioned in said first and second cavities of said non-conductive spool body; and an electromagnet unit for developing a magnetic field extending through said central channel of said non-conductive spool and including:
   (a) single bobbin coil having a longitudinal axis extending through the center of said central channel of said non-conductive spool body,
   (b) a first pole piece of highly permeable magnetic material extending from a first end of said single bobbin coil toward said central channel of said non-conductive spool body,
   (c) a second pole piece of highly permeable magnetic material extending toward said central channel of said non-conductive spool body, diametrically opposed from said first pole piece, and on an axis common with said first pole piece, and
   (d) a magnetic return path extending between said second pole piece and a second end of said first pole piece, only said first pole piece holding said single bobbin coil in position to said non-conductive spool body.

2. An electromagnetic flowmeter according to claim 1 wherein:
   (a) said non-conductive spool body further includes third and fourth cavities, relative to liquid flow through the electromagnetic flowmeter, respectively upstream and downstream of said measuring electrodes, and
   (b) said electromagnetic flowmeter further includes third and fourth grounding electrodes, respectively positioned in said third and fourth cavities.

3. An electromagnetic flowmeter according to claim 2 wherein said single bobbin coil includes a spool bobbin and wiring wound on said spool bobbin.

4. An electromagnetic flowmeter according to claim 3 wherein said first pole piece and second pole piece have conical shapes which are focused toward said central channel of said non-conductive spool body.

* * * * *